(12) United States Patent
Kawasaki et al.

(10) Patent No.: US 9,124,133 B2
(45) Date of Patent: Sep. 1, 2015

(54) CHARGING APPARATUS FOR CONSTRUCTION MACHINE

(75) Inventors: Haruhiko Kawasaki, Atsugi (JP); Masahiro Egawa, Kawaguchi (JP)

(73) Assignee: KAYABA INDUSTRY CO., LTD., Tokyo (JP)

( * ) Notice: Subject to any disclaimer, the term of this patent is extended or adjusted under 35 U.S.C. 154(b) by 688 days.

(21) Appl. No.: 13/512,867

(22) PCT Filed: Feb. 1, 2011

(86) PCT No.: PCT/JP2011/052061
§ 371 (c)(1),
(2), (4) Date: May 30, 2012

(87) PCT Pub. No.: WO2011/096404
PCT Pub. Date: Aug. 11, 2011

(65) Prior Publication Data
US 2012/0228948 A1    Sep. 13, 2012

(30) Foreign Application Priority Data
Feb. 8, 2010    (JP) .................................. 2010-25810

(51) Int. Cl.
H02J 1/00    (2006.01)
H02J 7/14    (2006.01)
E02F 9/20    (2006.01)

(52) U.S. Cl.
CPC .............. *H02J 7/1492* (2013.01); *E02F 9/2091* (2013.01); *H02J 7/1423* (2013.01); *Y02T 10/92* (2013.01); *Y10T 307/696* (2015.04)

(58) Field of Classification Search
CPC ..... H02J 7/1423; H02J 7/1492; E02F 9/2091; Y02T 10/92

USPC ............................................................ 307/87
See application file for complete search history.

(56) References Cited

U.S. PATENT DOCUMENTS

2004/0021441 A1* 2/2004 Komiyama et al. ........... 320/104

FOREIGN PATENT DOCUMENTS

| JP | 09-107639 A | 4/1997 |
|---|---|---|
| JP | 10-051907 A | 2/1998 |
| JP | 2003-111301 | 4/2003 |
| JP | 2004-229461 | 8/2004 |
| JP | 2006-304574 A | 11/2006 |
| JP | 2007-110855 | 4/2007 |
| JP | 2009-235717 A | 10/2009 |

OTHER PUBLICATIONS

Machine translation of JP 09-107639 A; Sawafuji Electric Co Ltd.; Apr. 1997.*
Machine translation of JP 2006-304574 A; Totota Motor Corp; Feb. 1998.*

* cited by examiner

*Primary Examiner* — Jared Fureman
*Assistant Examiner* — Duc M Pham
(74) *Attorney, Agent, or Firm* — Rabin & Berdo, P.C.

(57) ABSTRACT

A charging apparatus includes a diode, a switch, a high-voltage conversion circuit, and a controller which determines whether a charge capacity of a low-voltage battery is above a threshold and outputs a signal for supplying power of a generator to the low-voltage battery when the charge capacity is equal to or below the threshold while outputs a signal for charging the high-voltage battery when the charge capacity is above the threshold value.

3 Claims, 4 Drawing Sheets

CHARGING APPARATUS FOR CONSTRUCTION MACHINE

TECHNICAL FIELD

This invention relates to a charging apparatus for charging a battery of a construction machine, for example, a hybrid construction machine.

BACKGROUND ART

A charging apparatus for a construction machine disclosed in JP2009-235717A charges a low-voltage battery with power required by solenoids for operation valves, etc., a controller for controlling them, and the like. The low-voltage battery is connected to a generator which is rotated by a drive force of an engine and power generated by the generator is charged into the low-voltage battery.

When the low-voltage battery is fully charged, the generator is idled with no load to stop a power generation function of the generator. As the charged amount of the low-voltage battery decreases, the power generation function of the generator is automatically started to recharge the low-voltage battery.

SUMMARY OF INVENTION

In the above conventional charging apparatus for the construction machine, the generator is idled with no load when the low-voltage battery is fully charged, wherefore energy loss accordingly increases.

This invention aims to provide a charging apparatus for a construction machine which suppresses energy loss to a minimum level.

One aspect of the present invention is directed to a charging apparatus for a construction machine including an engine for rotating a pump, a generator to be rotated by a drive force of the engine, a low-voltage battery for storing power from the generator, and a high-voltage battery connected in parallel with the low-voltage battery with respect to the generator and adapted to store power from the generator.

The charging apparatus comprises a switching circuit which switches the supply of the power from the generator to either one of the low-voltage battery and the high-voltage battery; a high-voltage conversion circuit provided between the switching circuit and the high-voltage battery which converts a low voltage into a high voltage; and a controller which determines whether a charge capacity of the low-voltage battery is above a threshold and outputs a signal for supplying the power of the generator to the low-voltage battery to the switching circuit when the charge capacity is equal to or below the threshold while outputs a signal for charging the high-voltage battery to the switching circuit when the charge capacity is above the threshold value.

According to this aspect, the high-voltage battery can be charged with the power generated by the generator when the low-voltage battery reaches a fully charged state. The generator is not idled in a no-load state and energy loss is suppressed to a minimum level.

Since the controller monitors a charged state of the low-voltage battery and automatically introduces the power generated by the generator to the low-voltage battery when the charge capacity falls to or below the threshold, the low-voltage battery does not experience a power shortage.

Embodiments of the present invention and advantages thereof are described in detail below with reference to the accompanying drawings.

EMBODIMENTS OF INVENTION

Figure 1:
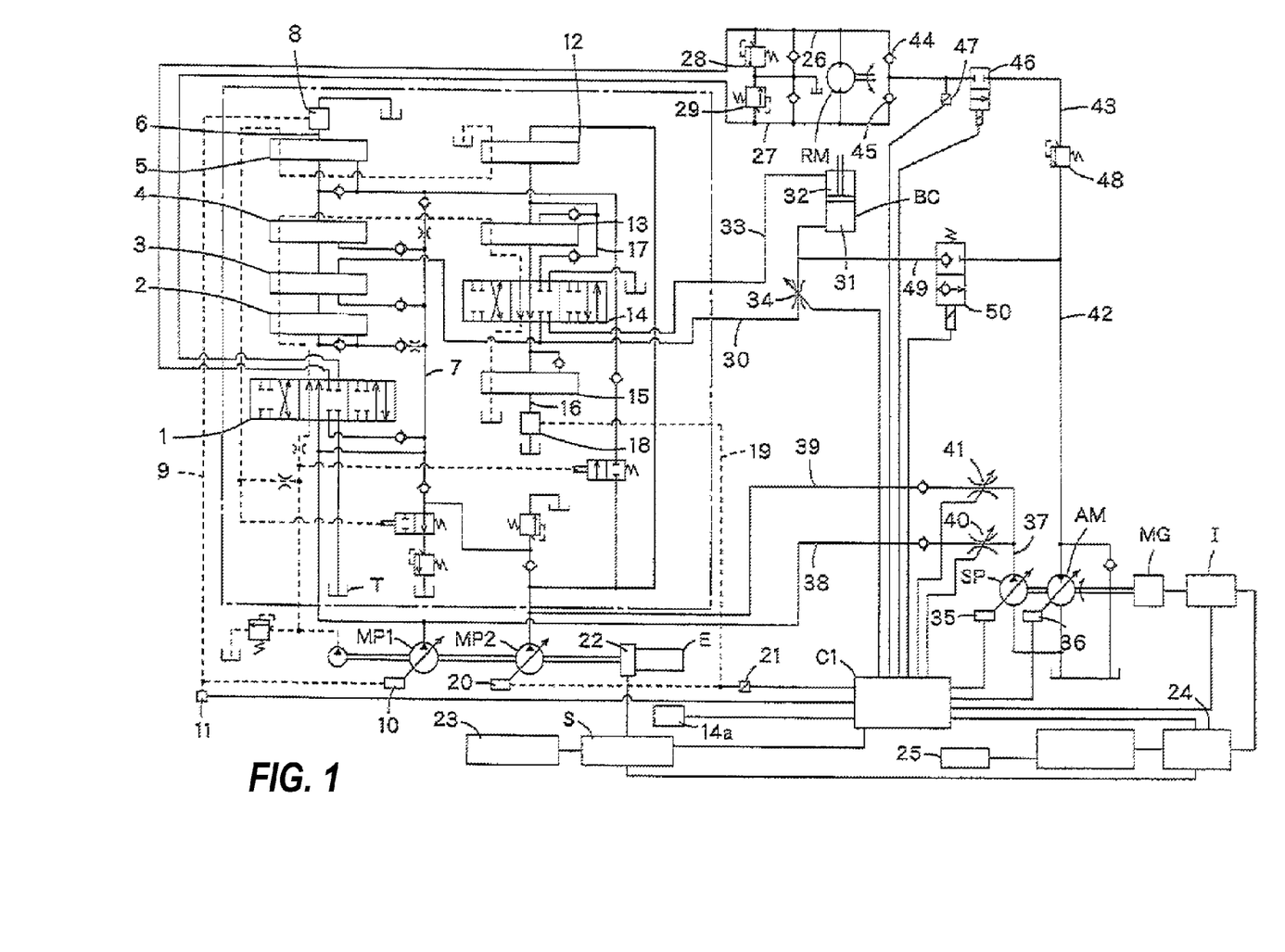
FIG. 1 is a hydraulic circuit diagram of a first embodiment.
Figure 2:
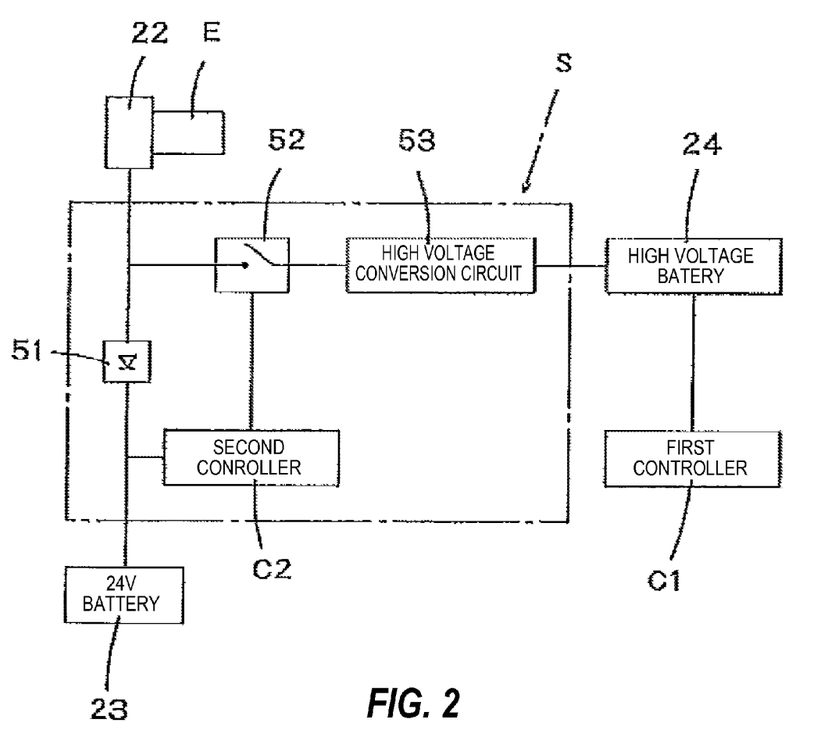
FIG. 2 is a circuit system diagram of the first embodiment.
Figure 3:
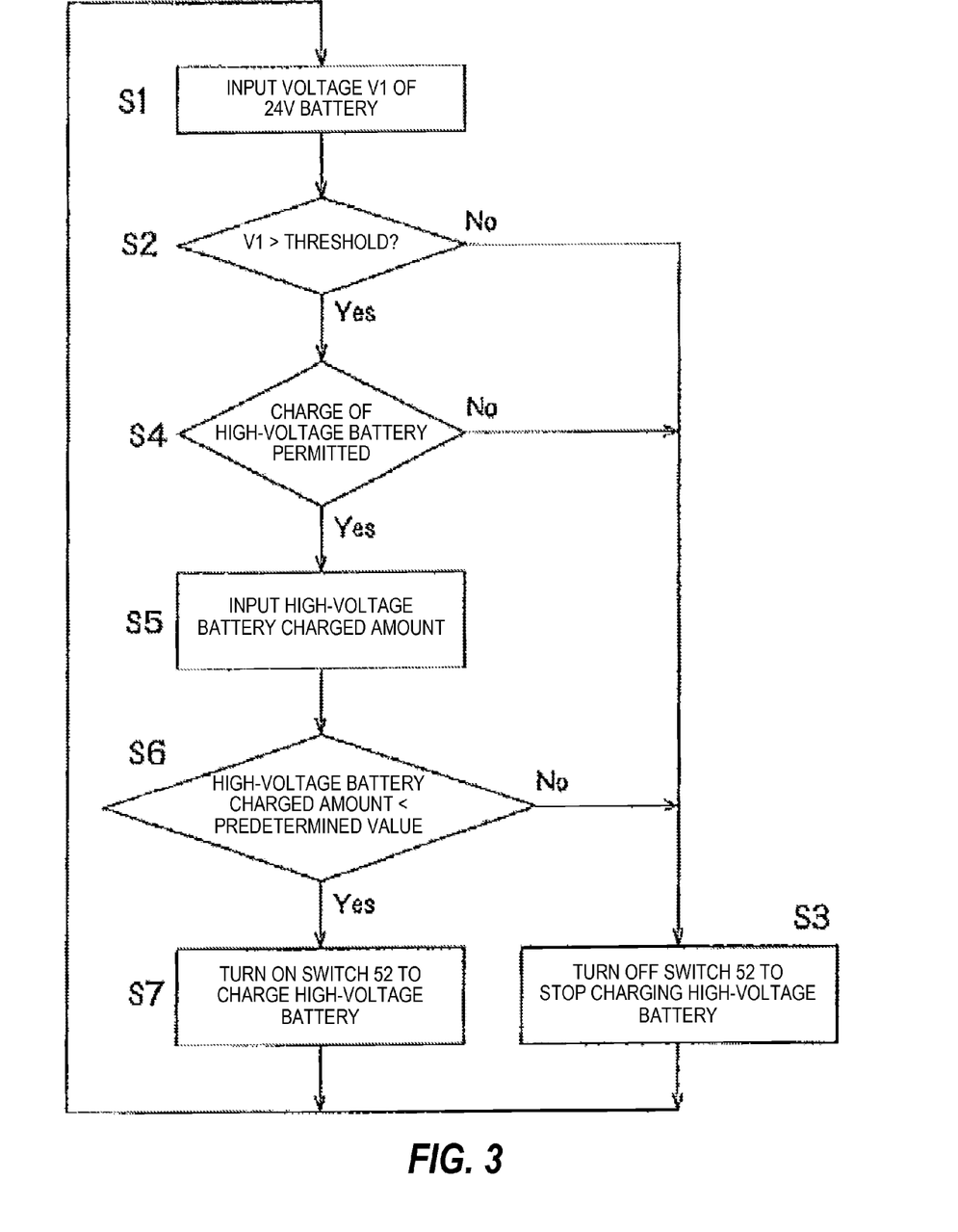
FIG. 3 is a control flow chart of the first embodiment.

A first embodiment shown in FIGS. 1 to 3 is a control system for a power shovel. The control system includes variable-capacity first and second main pumps MP1, MP2. A first circuit system is connected to the first main pump MP1, and a second circuit system is connected to the second main pump MP2.

To the first circuit system are connected a control valve 1 for controlling a rotation motor RM, a control valve 2 for arm first speed for controlling an arm cylinder, a control valve 3 for boom second speed for controlling a boom cylinder BC, an auxiliary control valve 4 for controlling an auxiliary attachment and a control valve 5 for a left travel motor for controlling the left travel motor in this order from an upstream side.

The respective control valves 1 to 5 are connected to the first main pump MP1 via a neutral flow path 6 and a parallel passage 7.

A pilot pressure generating mechanism 8 is provided downstream of the control valve 5 for the left travel motor in the neutral flow path 6. The pilot pressure generating mechanism 8 generates a high pilot pressure if a flow rate therethrough is high while generating a low pilot pressure if the flow rate is low.

The neutral flow path 6 introduces all or part of fluid discharged from the first main pump MP1 to a tank T when all the control valves 1 to 5 are at or near neutral positions. In this case, a high pilot pressure is generated since the flow rate through the pilot pressure generating mechanism 8 is also high.

If the control valves 1 to 5 are switched to full-stroke states, the neutral flow path 6 is closed and fluid does not flow any longer. Accordingly, in this case, the flow rate through the pilot pressure generating mechanism 8 is almost zero and the pilot pressure is kept at zero.

However, depending on the operated amounts of the control valves 1 to 5, part of pump-discharged oil is introduced to an actuator and part thereof is introduced to the tank T from the neutral flow path 6. Thus, the pilot pressure generating mechanism 8 generates a pilot pressure corresponding to the flow rate in the neutral flow path 6. In other words, the pilot pressure generating mechanism 8 generates the pilot pressure corresponding to the operated amounts of the control valves 1 to 5.

A pilot flow path 9 is connected to the pilot pressure generating mechanism 8. The pilot flow path 9 is connected to a regulator 10 for controlling a tilting angle of the first main pump MP1. The regulator 10 controls the discharge amount of the first main pump MP1 in inverse proportion to a pilot pressure. Accordingly, the discharge amount of the first main pump MP1 is kept maximum when the control valves 1 to 5 are set to the full stroke states so that the flow in the neutral flow path 6 becomes zero, in other words, when the pilot pressure generated by the pilot pressure generating mechanism 8 becomes zero.

A first pressure sensor 11 is connected to the pilot flow path 9. A pressure signal detected by the first pressure sensor 11 is input to a first controller C1.

To the second circuit system are connected a control valve 12 for controlling a right travel motor, a bucket control valve 13 for controlling a bucket cylinder, a control valve 14 for boom first speed for controlling the boom cylinder BC, and a control valve 15 for arm second speed for controlling the arm cylinder in this order from an upstream side. A sensor 14a for detecting an operating direction and an operated amount is provided in the control valve 14 for boom first speed.

The respective control valves 12 to 15 are connected to the second main pump MP2 via a neutral flow path 16. The bucket control valve 13 and the control valve 14 for boom first speed are connected to the second main pump MP2 via a parallel passage 17.

A pilot pressure generating mechanism 18 is provided downstream of the control valve 15 for arm second speed in the neutral flow path 16. The pilot pressure generating mechanism 18 functions in just the same manner as the pilot pressure generating mechanism 8.

A pilot flow path 19 is connected to the pilot pressure generating mechanism 18. The pilot flow path 19 is connected to a regulator 20 for controlling a tilting angle of the second main pump MP2. The regulator 20 controls the discharge amount of the second main pump MP2 in inverse proportion to a pilot pressure. Accordingly, the discharge amount of the second main pump MP2 is kept maximum when the control valves 12 to 15 are set to the full stroke states so that the flow in the neutral flow path 16 becomes zero, in other words, when the pilot pressure generated by the pilot pressure generating mechanism 18 becomes zero.

A second pressure sensor 21 is connected to the pilot flow path 19. A pressure signal detected by the second pressure sensor 21 is input to the first controller C1

The first and second main pumps MP1, MP2 are coaxially rotated by a drive force of one engine E. The engine E includes an alternator 22. The alternator 22 is rotated by excess power of the engine E to generate power. Power generated by the alternator 22 is charged into a low-voltage battery 23 or a high-voltage battery 24 via a charging apparatus S. The charging apparatus S is described in detail later. The low-voltage battery 23 is a 24V battery for a construction machine and the high-voltage battery 24 is a battery used for an electric motor MG or the like.

Passages 26, 27 communicating with the rotation motor RM are connected to an actuator port of the control valve 1 connected to the first circuit system. Brake valves 28, 29 are respectively connected to the both passages 26, 27. When the control valve 1 is kept at the shown neutral position, the actuator port is closed and the rotation motor RM remains stopped.

If the control valve 1 is switched, for example, to a right position in FIG. 1 from the above state, one passage 26 is connected to the first main pump MP1 and the other passage 27 communicates with the tank T. Accordingly, the rotation motor RM rotates by having pressure fluid supplied from the passage 26, and return fluid from the rotation motor RM is returned to the tank T via the passage 27.

If the control valve 1 is switched to a left position, pump-discharged fluid is supplied to the passage 27, the passage 26 communicates with the tank T, and the rotation motor RM rotates in a reverse direction.

When the rotation motor RM is driven, the brake valve 28 or 29 functions as a relief valve. When pressures in the passages 26, 27 increase to set pressures or higher, the brake valves 28, 29 are opened to introduce fluid at a high-pressure side to a low-pressure side. If the control valve 1 for the rotation motor is returned to the neutral position while the rotation motor RM is being rotated, the actuator port of the control valve 1 is closed. Even if the actuator port of the control valve 1 is closed in this way, the rotation motor RM continues to rotate due to inertial energy. By rotating due to inertial energy, the rotation motor RM functions as a pump. In this case, a closed circuit is formed by the passages 26, 27, the rotation motor RM and the brake valve 28 or 29, and the inertial energy is converted into thermal energy by the brake valve 28 or 29.

On the other hand, if the control valve 14 for boom first speed is switched to a right position in FIG. 1 from the neutral position, pressure fluid from the second main pump MP2 is supplied to a piston-side chamber 31 of the boom cylinder BC via a passage 30. Return fluid from a rod-side chamber 32 is returned to the tank T via a passage 33, whereby the boom cylinder BC extends.

On the contrary, if the control valve 14 for boom first speed is switched to a left position in FIG. 1, pressure fluid from the second main pump MP2 is supplied to the rod-side chamber 32 of the boom cylinder BC via the passage 33. Return fluid from the piston-side chamber 31 is returned to the tank T via the passage 30, whereby the boom cylinder BC contracts. The control valve 3 for boom second speed is switched in association with the control valve 14 for boom first speed.

A proportional electromagnetic valve 34, the opening of which is controlled by the first controller C1, is provided in the passage 30 connecting the piston-side chamber 31 of the boom cylinder BC and the control valve 14 for boom first speed. The proportional electromagnetic valve 34 is kept at a fully open position in a normal state.

Next, a variable-capacity sub-pump SP for assisting outputs of the first and second main pumps MP1, MP2 is described.

The variable-capacity sub-pump SP is rotated by a drive force of an electric motor MG doubling as a generator. A variable-capacity assist motor AM is also coaxially rotated by the drive force of the electric motor MG. An inverter I is connected to the electric motor MG. The inverter I is connected to the first controller C1 and the rotation speed of the electric motor MG and the like can be controlled by the first controller C1.

Titling angles of the sub-pump SP and the assist motor AM are controlled by tilting angle controllers 35, 36. The tilting angle controllers 35, 36 are controlled by output signals of the first controller C1.

A discharge passage 37 is connected to the sub-pump SP. The discharge passage 37 is branched off to a first joint passage 38 which joins at a discharge side of the first main pump MP1 and a second joint passage 39 which joins at a discharge side of the second main pump MP2. First and second proportional electromagnetic throttle valves 40, 41, the openings of which are controlled by output signals of the first controller C1, are provided in the respective first and second joint passages 38, 39.

A connection passage 42 is connected to the assist motor AM. The connection passage 42 is connected to the passages 26, 27 connected to the rotation motor RM via the joint passage 43 and check valves 44, 45. An electromagnetic switching valve 46, the opening and closing of which are controlled by the first controller C1, is provided in the joint passage 43. A pressure sensor 47 for detecting a pressure at the time of rotating the rotation motor RM or a pressure at the time of braking is provided between the electromagnetic switching valve 46 and the check valves 44, 45. A pressure signal of the pressure sensor 47 is input to the first controller C1.

In the joint passage 43, a safety valve 48 is provided at a position downstream of the electromagnetic switching valve 46 with respect to a flow from the rotation motor RM to the connection passage 42. The safety valve 48 prevents runaway of the rotation motor RM by maintaining the pressures in the passages 26, 27 when a system including the connection passages 42, 43 such as the electromagnetic switching valve 46 fails.

Further, a passage 49 communicating with the connection passage 42 is provided between the boom cylinder BC and the proportional electromagnetic valve 34. An electromagnetic on-off valve 50 controlled by the first controller C1 is provided in the passage 49.

As shown in FIG. 2, the charging apparatus S includes a diode 51 for allowing only the flow of a current from the alternator 22 to the low-voltage battery 23 when the alternator 22 and the low-voltage battery 23 are connected.

A switch 52 is provided in parallel with the diode 51 with respect to the alternator 22. The switch 52 is connected to the high-voltage battery 24 via a high-voltage conversion circuit 53 for converting a low voltage into a high voltage. The high-voltage conversion circuit 53 may serve the function of the switch 52.

A second controller C2 is connected to each of the low-voltage battery 23 and the switch 52. The second controller C2 is also connected to the first controller C1. The first controller C1 is also connected to the high-voltage battery 24 and has a function of checking a charge capacity of the high-voltage battery 24.

The second controller C2 has a function of checking whether or not the voltage of the low-voltage battery 23 is above a threshold, and controls the opening and closing of the switch 52.

The first controller C1 checks a charged state of the high-voltage battery 24 and the like, and outputs a charge permission signal for the high-voltage battery 24 to the second controller C2 if the high-voltage battery 24 is in a usable state.

The second controller C2 closes the switch 52 when the low-voltage battery 23 is above the threshold, the charge permission signal is input from the first controller C1 and the charged amount of the high-voltage battery 24 is below a reference value, and boosts the power of the alternator 22 via the high-voltage conversion circuit 53 to charge the high-voltage battery 24.

In the first embodiment, the charging apparatus S is formed into a module so as to be incorporated into an existing apparatus, i.e. the one including the alternator 22, the low-voltage battery 23, the high-voltage battery 24 and the first controller C1. Thus, the second controller C2 is provided in addition to the first controller C1. Accordingly, in the case of incorporating the charging apparatus into a construction machine from the beginning, one controller may be provided by causing the first controller C1 to have the functions of the second controller C2.

Functions of this embodiment are described below. In this embodiment, an assist flow rate of the sub-pump SP is set beforehand and the first controller C1 judges how the tilting angle of the sub-pump SP, that of the assist motor AM, the rotation speed of the electric motor MG and the like can be most efficiently controlled and controls the respective parts.

If the control valves 1 to 5 of the first circuit system are kept at the neutral positions, all the fluid discharged from the first main pump MP1 is introduced to the tank T via the neutral flow path 6 and the pilot pressure generating mechanism 8. If all the fluid discharged from the first main pump MP1 flows through the pilot pressure generating mechanism 8, a pilot pressure generated thereby becomes higher and a relatively high pilot pressure is also introduced to the pilot flow path 9. The regulator 10 operates by the action of the high pilot pressure introduced to the pilot flow path 9 to keep the discharge amount of the first main pump MP1 minimum. A pressure signal indicating the high pilot pressure at this time is input to the first controller C1 from the first pressure sensor 11.

Also when the control valves 12 to 15 of the second circuit system are kept at the neutral positions, the pilot pressure generating mechanism 18 generates a relatively high pilot pressure as in the first circuit system and this high pressure acts on the regulator 20 to keep the discharge amount of the second main pump MP2 minimum. A pressure signal indicating the high pilot pressure at this time is input to the first controller C1 from the second pressure sensor 21.

When pressure signals indicating relatively high pressures are input from the first and second pressure sensors 11, 21 to the first controller C1, the first controller C1 judges that the first and second main pumps MP1, MP2 maintain minimum discharge amounts and controls the tilting angle controllers 35, 36 to zero or minimize the tilting angles of the sub-pump SP and the assist motor AM.

When receiving signals indicating that the discharge amounts of the first and second main pumps MP1, MP2 are minimum, the first controller C1 may stop the rotation of the electric motor MG or may keep it rotate.

In the case of stopping the rotation of the electric motor MG, there is an effect of saving power consumption. In the case of keeping the electric motor MG rotate, the sub-pump SP and the assist motor AM also keep rotating. Thus, there is an effect of reducing a shock at the time of starting the sub-pump SP and the assist motor AM. In any case, whether to stop the electric motor MG or to keep it rotating may be determined according to the intended purpose and usage of the construction machine.

If any one of the control valves of the first and second circuit systems is switched in the above state, the flow rate in the neutral flow path 6 or 16 decreases according to the operated amount and the pilot pressure generated in the pilot pressure generating mechanism 8 or 18 accordingly decreases. If the pilot pressure decreases, the tilting angle of the first or second main pump MP1 or MP2 accordingly increases to increase the discharge amount.

In the case of increasing the discharge amount of the first or second main pump MP1 or MP2, the first controller C1 keeps the electric motor MG in a constantly rotating state. That is, if the electric motor MG stops when the discharge amounts of the first and second main pumps MP1, MP2 are minimum, the first controller C1 detects a decrease in the pilot pressure and restarts the electric motor MG.

The first controller C1 controls the openings of the first and second proportional electromagnetic throttle valves 40, 41 in accordance with pressure signals of the first and second pressure sensors 11, 21, whereby the discharge amount of the sub-pump SP is proportionally distributed and supplied to the first and second circuit systems.

According to this embodiment, the number of the pressure sensors can be reduced since the first controller C1 can control the tiling angle of the sub-pump SP and the openings of the first and second proportional electromagnetic throttle valves 40, 41 only by the pressure signals of the two first and second pressure sensors 11, 21.

On the other hand, if the control valve 1 is switched to either left or right, e.g. to the right position in FIG. 1 to drive the rotation motor RM connected to the first circuit system, the one passage 26 communicates with the first main pump MP1 and the other passage 27 communicates with the tank T to rotate the rotation motor RM. A rotation pressure at this time is kept at a set pressure of the brake valve 28. If the control valve 1 is switched to left in FIG. 1, the other passage 27 communicates with the first main pump MP1 and the one passage 26 communicates with the tank T to rotate the rotation motor RM. A rotation pressure at this time is also kept at a set pressure of the brake valve 29.

If the control valve 1 for the rotation motor is switched to the neutral position during the rotation of the rotation motor RM, a closed circuit is formed between the passages 26 and 27 and the brake valve 28 or 29 maintains a brake pressure of the closed circuit to convert inertial energy into thermal energy.

The pressure sensor 47 detects the rotation pressure or the brake pressure and inputs a pressure signal to the first controller C1. The first controller C1 switches the electromagnetic switching valve 46 from a closed position to an open position in the case of detecting a pressure which is within such a range as not to affect the rotation of the rotation motor RM or a braking operation and lower than the set pressures of the brake valves 28, 29. If the electromagnetic switching valve 46 is switched to the open position, pressure fluid introduced to the rotation motor RM flows into the joint passage 43 and is supplied to the assist motor AM via the safety valve 48 and the connection passage 42.

The first controller C1 controls the tilting angle of the assist motor AM in accordance with a pressure signal from the pressure sensor 47. This control is as follows.

Unless the pressure in the passage 26 or 27 is kept at a pressure necessary for the rotating operation or the braking operation, it becomes impossible to rotate the rotation motor RM or apply braking.

Accordingly, to keep the pressure in the passage 26 or 27 at the above rotation pressure or the brake pressure, the first controller C1 controls a load of the rotation motor RM while controlling the tilting angle of the assist motor AM. That is, the first controller C1 controls the tilting angle of the assist motor AM so that the pressure detected by the pressure sensor 47 becomes substantially equal to the rotation pressure of the rotation motor RM or the brake pressure.

If the assist motor AM obtains a rotational force, this rotational force acts on the coaxially rotating electric motor MG. The rotational force of the assist motor AM acts as an assist force for the electric motor MG. Accordingly, power consumption of the electric motor MG can be reduced by the rotational force of the assist motor AM.

The rotational force of the sub-pump SP can also be assisted by the rotational force of the assist motor AM. In this case, the assist motor AM and the sub-pump SP exhibit a pressure conversion function together.

That is, the pressure of the fluid flowing into the connection passage 42 is invariably lower than a pump-discharged pressure. To maintain the sub-pump SP at a high discharge pressure by utilizing this low pressure, a boosting function is exhibited by the assist motor AM and the sub-pump SP.

That is, an output of the assist motor AM is determined by a product of a displacement volume $Q_1$ per rotation and a pressure $P_1$ at that time. An output of the sub-pump SP is determined by a product of a displacement volume $Q_2$ per rotation and a discharge pressure $P_2$ at that time.

Since the assist motor AM and the sub-pump SP are coaxially rotated in this embodiment, $Q_1 \times P_1 = Q_2 \times P_2$ has to hold. Accordingly, if the displacement volume $Q_1$ of the assist motor AM is set, for example, to be three times as much as the displacement volume $Q_2$ of the sub-pump SP, i.e. $Q_1 = 3Q_2$, the above equation is $3Q_2 \times P_1 = Q_2 \times P_2$. If the both sides of this equation is divided by $Q_2$, $3P_1 = P_2$ holds.

Accordingly, the sub-pump SP can be maintained at a predetermined discharge pressure by the output of the assist motor AM by changing the tiling angle of the sub-pump SP and controlling the displacement volume $Q_2$. In other words, the fluid can be discharged from the sub-pump SP after boosting the fluid pressure from the rotation motor RM.

The tiling angle of the assist motor AM is so controlled as to keep the pressures in the passages 26, 27 at the rotation pressure or the brake pressure. Thus, the tilting angle of the assist motor AM is inevitably determined in the case of utilizing the fluid from the rotation motor RM. To exhibit the pressure conversion function while determining the tiling angle of the assist motor AM in this way, the tilting angle of the sub-pump SP is controlled.

If a pressure in the system including the connection passages 42, 43 falls below the rotation pressure or the brake pressure for a certain cause, the first controller C1 closes the electromagnetic switching valve 46 in accordance with a pressure signal from the pressure sensor 47 so that the rotation motor RM is not affected.

If there is a fluid leak in the connection passage 42, the safety valve 48 functions so that the pressures in the passages 26, 27 do not decrease more than necessary, thereby preventing runaway of the rotation motor RM.

Next, a case is described where the boom cylinder BC is controlled by switching the control valve 14 for boom first speed and the control valve 3 for boom second speed of the first circuit system in association with the control valve 14.

If the control valve 14 for boom first speed and the control valve 3 associated therewith are switched to actuate the boom cylinder BC, the sensor 14a detects an operating direction and an operated amount of the control valve 14 and an operation signal thereof is input to the first controller C1.

In accordance with the operation signal of the sensor 14a, the first controller C1 determines whether an operator is trying to raise or lower the boom cylinder BC. If a signal for raising the boom cylinder BC is input to the first controller C1, the first controller C1 keeps the proportional electromagnetic valve 34 in the normal state, in other words, keeps the proportional electromagnetic valve 34 at the fully open position. At this time, the first controller C1 keeps the electromagnetic on-off valve 50 at the shown closed position and controls the rotation speed of the electric motor MG and the tilting angle of the sub-pump SP to ensure a predetermined discharge amount from the sub-pump SP.

On the other hand, if a signal for lowering the boom cylinder BC is input to the first controller C1 from the sensor 14a, the first controller C1 calculates a lowering speed of the boom cylinder BC required by the operator according to the operated amount of the control valve 14, closes the proportional electromagnetic valve 34 and switches the electromagnetic on-off valve 50 to the open position.

If the proportional electromagnetic valve 34 is closed and the electromagnetic on-off valve 50 is switched to the open position, all the return fluid of the boom cylinder BC is supplied to the assist motor AM. If the flow rate consumed by the assist motor AM is lower than a flow rate necessary to maintain the lowering speed required by the operator, the boom cylinder BC cannot maintain the lowering speed required by the operator. In this case, the first controller C1 controls the opening of the proportional electromagnetic valve 34 to return a flow rate equal to or higher than that consumed by the assist motor AM to the tank T based on the operated amount of the control valve 14, the tilting angle of the assist motor AM, the rotation speed of the electric motor MG and the like and maintains the lowering speed of the boom cylinder BC required by the operator.

If fluid is supplied to the assist motor AM, the assist motor AM rotates. The rotational force of the assist motor AM acts on the coaxially rotating electric motor MG as an assist force for the electric motor MG. Accordingly, power consumption can be reduced by the rotational force of the assist motor AM.

On the other hand, it is also possible to rotate the sub-pump SP only by the rotational force of the assist motor AM without supplying power to the electric motor MG. In this case, the assist motor AM and the sub-pump SP exhibit the pressure conversion function in the same manner as described above.

Next, a case is described where the rotating operation of the rotation motor RM and the lowering operation of the boom cylinder BC are simultaneously performed.

In the case of lowering the boom cylinder BC while rotating the rotation motor RM, the fluid from the rotation motor RM and the return fluid from the boom cylinder BC are joined in the connection passage 42 and supplied to the assist motor AM.

As the pressure in the connection passage 42 increases, the pressure in the joint passage 43 also increases. Even if this pressure becomes higher than the rotation pressure of the rotation motor RM or the brake pressure, the rotation motor RM is not affected since the check valves 44, 45 are provided.

If the pressure in the connection passage 42 becomes lower than the rotation pressure or the brake pressure, the first controller C1 closes the electromagnetic switching valve 46 in accordance with a pressure signal from the pressure sensor 47.

Accordingly, in the case of simultaneously performing the rotating operation of the rotation motor RM and the lowering operation of the boom cylinder BC, the tilting angle of the assist motor AM may be determined based on a required lowering speed of the boom cylinder BC regardless of the rotation pressure or the brake pressure.

In any case, the output of the sub-pump SP can be assisted by that of the assist motor AM and the flow rate discharged from the sub-pump SP can be proportionally distributed by the first and second proportional electromagnetic throttle valves 40, 41 and supplied to the first and second circuit systems.

On the other hand, in the case of using the electric motor MG as a generator using the assist motor AM as a drive source, the electric motor MG can exhibit the power generation function utilizing the output of the assist motor AM if a substantially no-load state is set by zeroing the tilting angle of the sub-pump SP and the assist motor AM maintains an output necessary to rotate the electric motor MG.

In the first embodiment, it is possible to generate power by the alternator 22 utilizing the output of the engine E and by the electric motor MG utilizing the assist motor AM. The generated power is stored in the high-voltage battery 24. Since the high-voltage battery 24 can be charged utilizing a household power supply, the power of the electric motor MG can be obtained in various manners.

The low-voltage battery 23 for supplying power to solenoids of the control valves, an electric system for controlling the solenoids, the first and second controllers C1, C2 and the like is charged with the power generated by the alternator 22. At this time, the charging apparatus S functions as follows.

That is, as shown in FIG. 3, the power of the alternator 22 is preferentially charged into the low-voltage battery 23 via the diode 51 (Step 51).

The second controller C2 monitors whether or not a voltage V1 of the low-voltage battery 23 is above a threshold. If the voltage V1 is equal to or below the threshold, the second controller C2 keeps the switch 52 off (Steps S2, S3). That is, the charging apparatus S preferentially charges the low-voltage battery 23.

On the other hand, if the voltage V1 of the low-voltage battery 23 is above the threshold, the second controller C2 determines whether a charge permission signal for the high-voltage battery 24 is input from the first controller C1 (Step S4). The first controller C1 constantly monitors the charge capacity of the high-voltage battery 24 and outputs a charged voltage signal.

If the charge permission signal is input to the second controller C2, the first controller C1 inputs the charged voltage signal of the high-voltage battery 24 to the second controller C2 (Step S5). The second controller determines whether or not a charged voltage of the high-voltage battery 24 is above a reference value.

As a result, if the charged voltage of the high-voltage battery 24 is equal to or above the reference value, the second controller C2 turns off the switch 52 (Steps S6, S3).

If the charged voltage of the high-voltage battery 24 is below the reference value, the second controller C2 turns on the switch 52 (Steps S6, S7) and the power generated by the alternator 22 is boosted in the high-voltage conversion circuit 53 and charges the high-voltage battery 24.

Accordingly, the second controller C2 turns on the switch 52 to charge the high-voltage battery 24 when conditions that the voltage V1 of the low-voltage battery 23 is above the threshold value, the charge permission signal for the high-voltage battery 24 is input from the first controller C1 and the charged voltage of the high-voltage battery 24 is below the reference value are satisfied.

Figure 4:
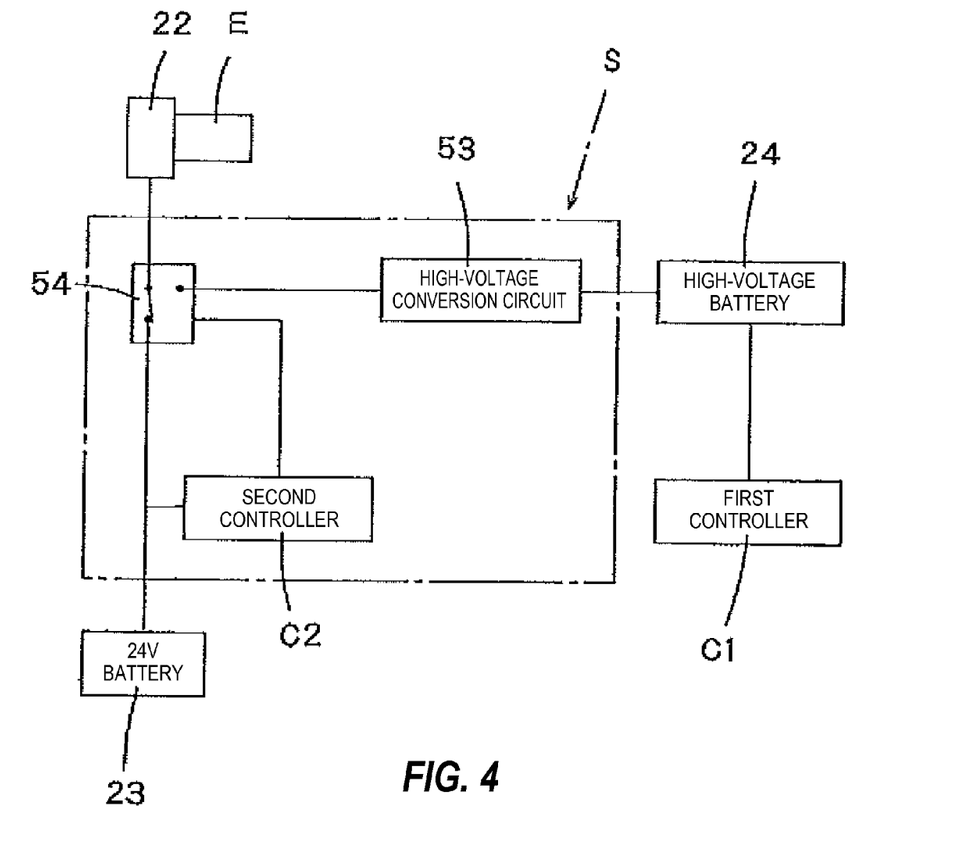
FIG. 4 is a circuit system diagram of a second embodiment.

A second embodiment shown in FIG. 4 is constructed such that a circuit connecting the alternator 22 and the low-voltage battery 23 and a circuit connecting the alternator 22 and the high-voltage battery 24 are turned on and off by one switch mechanism 54 instead of by the diode 51 of the first embodiment. Normally, the alternator 22 is connected to the low-voltage battery 23.

The switching on and off of the high-voltage battery by the switch mechanism 54 is controlled by the second controller C2. Control conditions for this are the same as in the first embodiment.

The embodiments of the present invention have been described above. The above embodiments are merely illustration of application examples of the present invention and not of the nature to specifically limit the technical scope of the present invention to the above embodiments.

The present application claims a priority based on Japanese Patent Application No. 2010-25810 filed with the Japanese Patent Office on Feb. 8, 2010, all the contents of which are hereby incorporated by reference.

INDUSTRIAL APPLICABILITY

This invention is applicable to hybrid construction machines.

The invention claimed is:

1. A charging apparatus for a construction machine including an engine for rotating a pump, a generator to be rotated by a drive force of the engine, a low-voltage battery for storing power from the generator, and a high-voltage battery connected in parallel with the low-voltage battery with respect to the generator and adapted to store power from the generator, comprising:

a switching circuit which switches between a first state and a second state, the first state being a state where the power from the generator is not supplied to the high-voltage battery but is supplied to the low-voltage battery, the second state being a state where the power from the generator is supplied to the high-voltage battery;

a high-voltage conversion circuit provided between the switching circuit and the high-voltage battery which converts a low voltage into a high voltage; and a controller which determines whether a charge capacity of the low-voltage battery has reached a threshold, outputs a signal to the switching circuit to switch to the first state when the charge capacity of the low-voltage battery is equal to or below the threshold, for supplying the power of the generator to the low-voltage battery while not supplying the power of the generator to the high-voltage battery, and outputs a signal to the switching circuit to switch to the second state when the charge capacity of the low-voltage battery has reached the threshold, for charging the high-voltage battery, the threshold being a value of the charge capacity of the low-voltage battery when the low-voltage battery is fully charged.

2. The charging apparatus according to claim 1, wherein the controller:

monitors the charge capacity of the low-voltage battery;

determines whether or not the charge capacity of the low-voltage battery has reached the threshold;

determines whether or not a charge capacity of the high-voltage battery is below a reference value; and causes the switching circuit to switch by outputting a signal and charges the high-voltage battery with the power from the generator via the high-voltage conversion circuit when the charge capacity of the low-voltage battery is determined to have reached the threshold and the charge capacity of the high-voltage battery is determined to be below the reference value.

3. The charging apparatus according to claim 1, wherein the switching circuit includes:

a diode which is provided between the generator and the low-voltage battery and allows only the flow of a current from the generator to the low-voltage battery; and a switch provided between an upstream side of the diode and the high-voltage conversion circuit.

* * * * *